Figure 1:
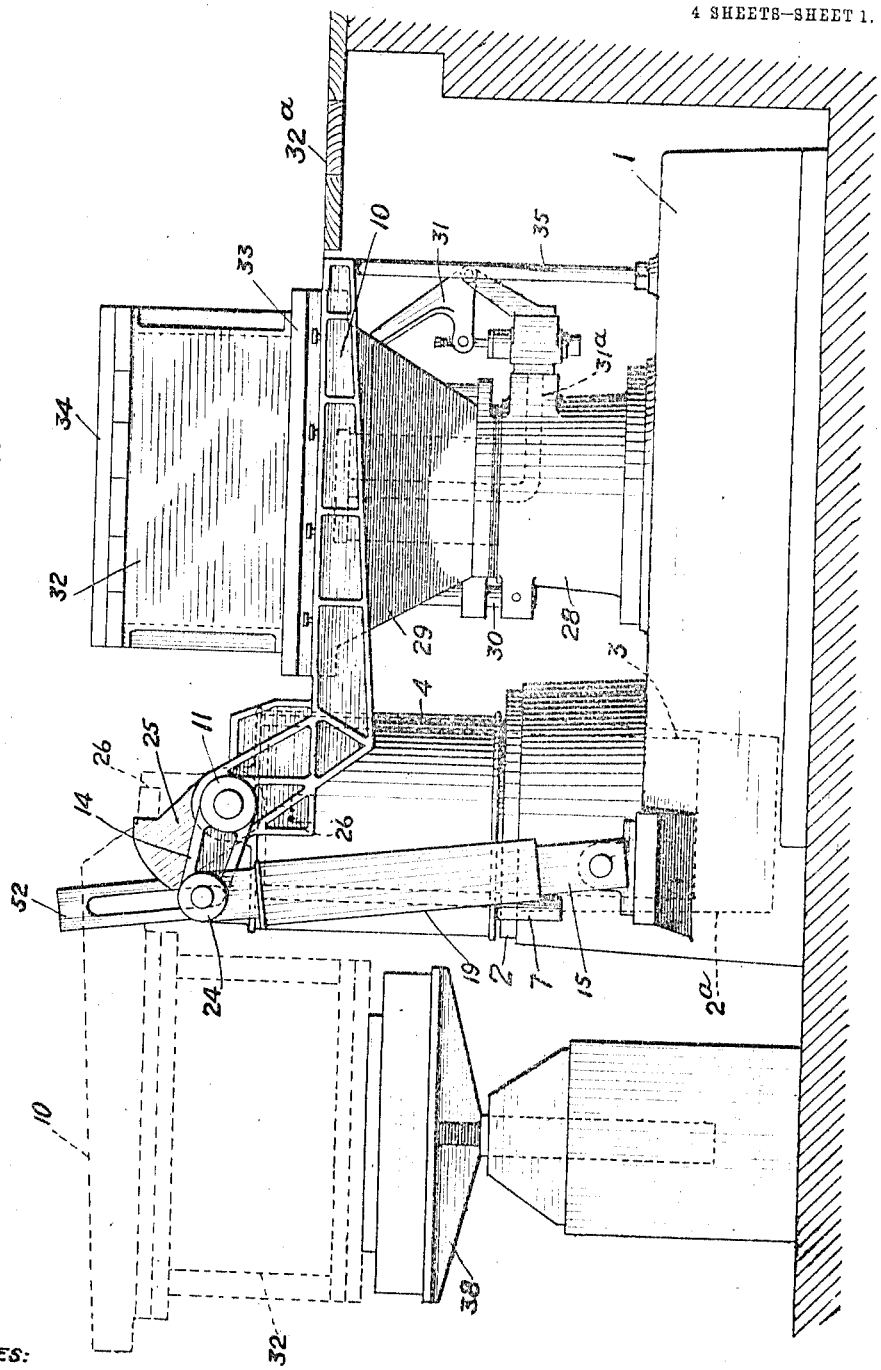

W. LEWIS & J. T. RAMSDEN.
MOLDING MACHINE.
APPLICATION FILED APR. 3, 1909.

1,072,395.

Patented Sept. 2, 1913.

4 SHEETS—SHEET 1.

WITNESSES:
Robt. R. Kitchel.
Frank E. Lunch.

INVENTORS
Wilfred Lewis
John T. Ramsden
BY
Augustus B. Stoughton
ATTORNEY.

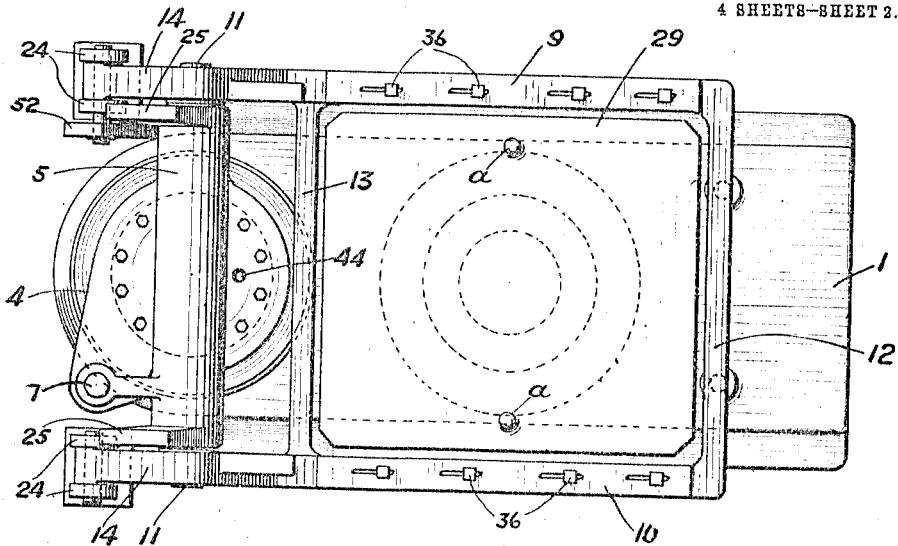
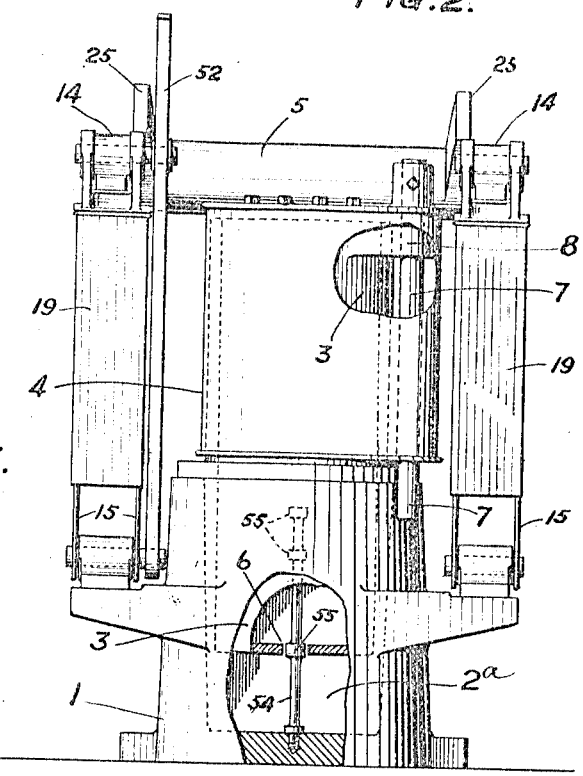

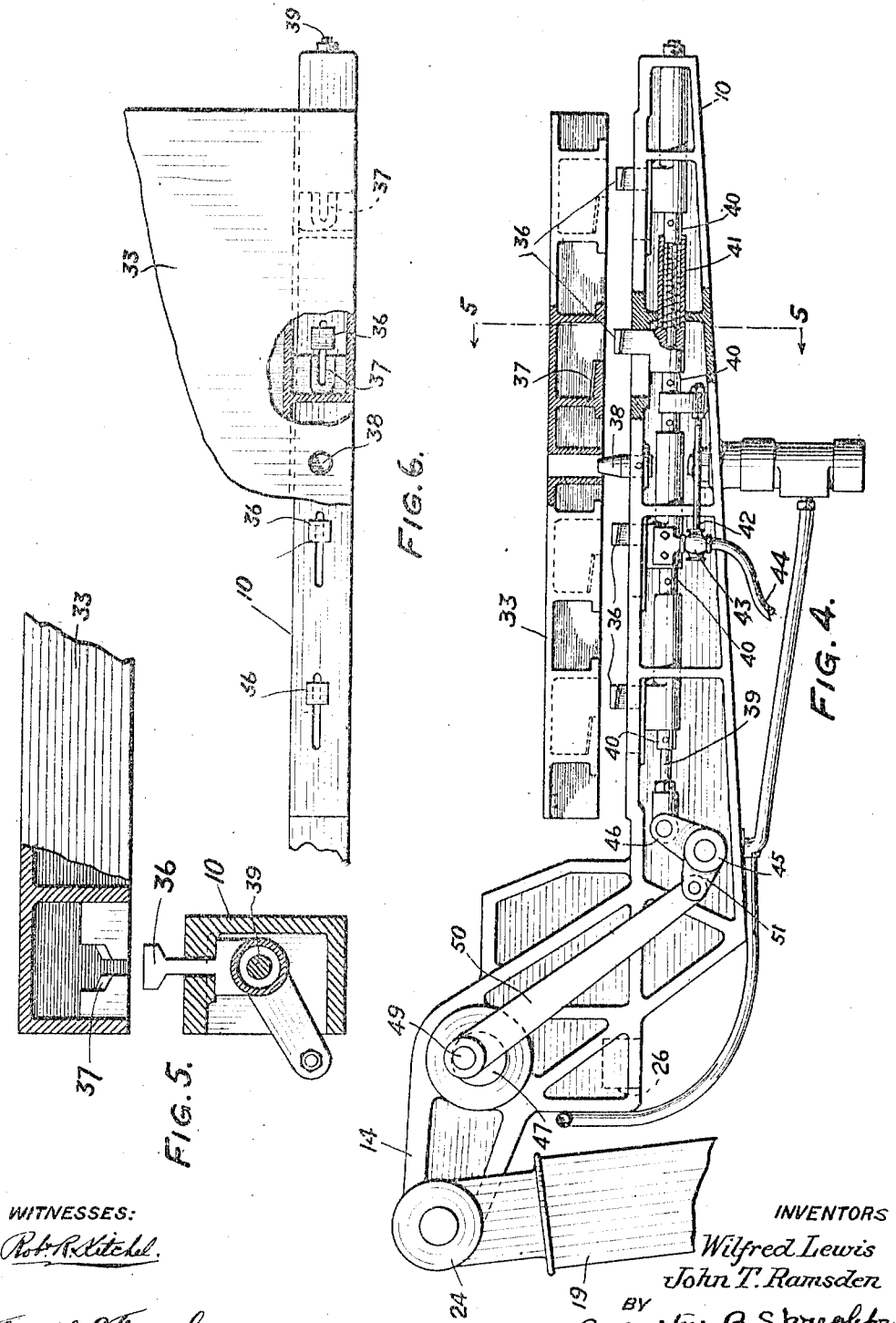

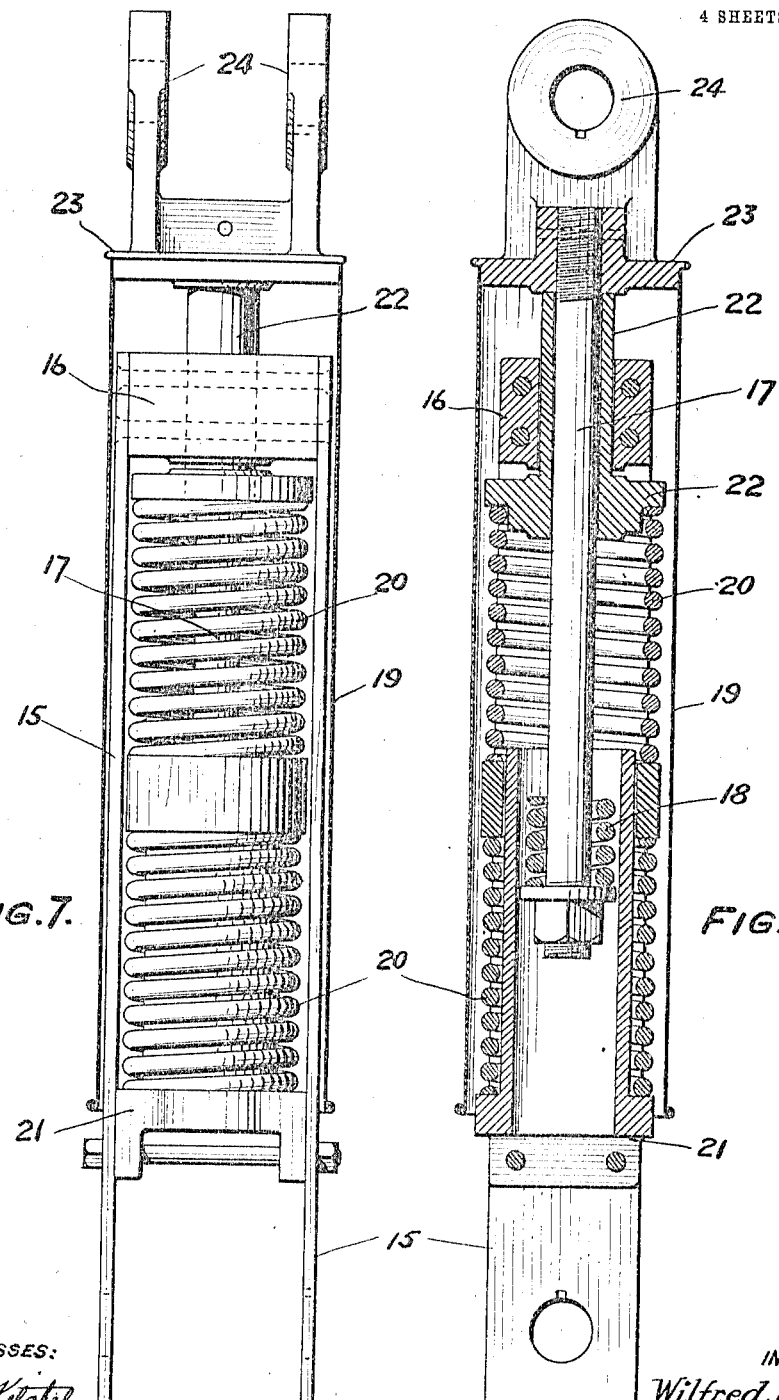

UNITED STATES PATENT OFFICE.

WILFRED LEWIS AND JOHN T. RAMSDEN, OF PHILADELPHIA, PENNSYLVANIA, ASSIGNORS TO THE TABOR MANUFACTURING COMPANY, OF PHILADELPHIA, PENNSYLVANIA, A CORPORATION OF NEW JERSEY.

MOLDING-MACHINE.

1,072,395.

Specification of Letters Patent.

Patented Sept. 2, 1913.

Application filed April 3, 1909. Serial No. 487,741.

*To all whom it may concern:*

Be it known that we, WILFRED LEWIS and JOHN T. RAMSDEN, citizens of the United States, residing at Philadelphia, in the county of Philadelphia and State of Pennsylvania, have jointly invented certain new and useful Improvements in Molding-Machines, of which the following is a specification.

The principal object of the present invention is to provide a simple, comparatively inexpensive and reliable molding machine of the hinged variety, which shall operate by power and also as a jarring machine.

The invention will be claimed at the end hereof, but will first be described in connection with the embodiment of it selected for illustration in the accompanying descriptive drawings, in which—

Figure 1, is a side view of the machine showing the principal parts in one position and indicating in dotted lines another position thereof. Fig. 2, is a top or plan view showing the machine with the flask removed. Fig. 3, is an end view looking toward the right in Fig. 1. Fig. 4, is a side view with parts broken away, drawn to an enlarged scale, and illustrating details of a pattern plate locking device. Fig. 5, is a section on the line 5—5, of Fig. 4, looking toward the left. Fig. 6, is a top or plan view partly in section of a portion of the device shown in Fig. 4, and Figs. 7 and 8, are respectively an end and a transverse sectional view drawn to an enlarged scale of parts shown in Fig. 1.

Mounted upon a suitable base, frame or support 1, there is a piston and cylinder arranged for movement in vertical direction. As shown the cylinder 2 rests upon the frame 1 to which it is attached by bolts, not shown, and beneath this cylinder a cavity $2^a$ is formed in the frame 1 to receive the piston 3, which is movable vertically in the cylinder 2.

4, is a dust guard depending from the piston cover or cap 5, bolted to the piston as shown. This cap 5 carries a horizontal shaft or pivot 11 and a vertical shaft or guide pin 7. The part 5 is therefore a hinge member.

The piston in the present instance is shown as hollow and may be filled with a liquid which is forced through an aperture 6, as by the introduction of compressed air into the piston through the opening 44, connected with a supply of compressed air used as a source of power, and controlled by an operating valve, not shown, of any well known type. The compressed air which is introduced into the piston 3 through the opening 44, in its cap 5, acts upon the liquid filling all the space beneath and forces it out of the piston into the cavity $2^a$, thus causing the piston 3 to rise. When the air in the piston 3 is allowed to escape into the atmosphere the weight of the piston 3, cap 5, and parts sustained thereby, drives the liquid out of the cavity $2^a$ into the piston 3 again, thus causing the piston 3 to descend. The piston and cylinder are held against rotary movement in respect to each other and for this purpose a guide pin 7, is attached to the cap 5 in any convenient position. This pin 7, passes through a lug 8 on the cylinder 2 and the cap 5 is thus permitted to rise and fall with the piston 3 and is not permitted to rotate about the axis of the piston 3.

Flask carrying arms 9 and 10, are hinged to the hinge member or cap 5, as at 11. These arms are shown as connected together at their outer ends by a brace 12, and near their point of pivotal support by a brace 13. In rear of the pivot 11, the arms are provided with extensions 14 integral therewith and there are lost motion couplings between the extensions 14 and the base of the frame. These couplings are shown to consist of links 15, pivotally connected with the base 1 and attached to a head 16. Through an opening in the head 16, works the shank of a bolt 17, that is pivotally connected with the extensions 14 and provided with a nut and buffer spring 18.

19, are dust guards and 20, is a spring shown as consisting of two parts with a movable ring interposed between, and this spring 20 is placed between a support 21, attached to the links and a sleeve 22, that encircles the shank of the bolt 17, and abuts on the member 23, by which the bolt 17, is connected to the pivot eyes 24. As the described couplings are extended the part or sleeve 22 will bear upon the head 16 and continued movement will bring the spring 18 to bear upon the sleeve 22 when no further movement can take place except by compressing the spring 18. The couplings may be freely contracted until they reach the position shown in Figs. 7 and 8, and thereafter further contraction is opposed by the force of the spring 20, acting upon the sleeve 22, which abuts on the part 23, and this action of the spring serves to balance in whole or in part the weight exclusive of the flask which is carried by the arms 9 and 10, as will be hereinafter described.

25, are stop arms or rigid members connected with or projecting from the hinge member 5, and upon the under side of which the tops of the members 24 of the couplings abut to limit the turning motion of the arms in one direction.

The arms 9 and 10, are provided with projections 26 extending from their inside surfaces inward and which abut on the top surfaces of the stops 25 fast to the cap 5, and position the arms at right angles to the vertical line of movement of the cap or hinge member 5. This occurs when the parts are in the position shown by the dotted lines in Fig. 1.

28, is a jarring head which comprises a base and a table 29, with a piston and cylinder interposed between them.

30, is a guide pin working through a suitable eye for preventing rotary motion of the table in its up and down movements.

31, are valve connections and 31ª, a supply connection for the piston and cylinder of the jarring head.

The table 29, is adapted to work up and down between the arms 9 and 10 and their braces and is provided with flask pins a.

32ª, indicates the floor level which may be conveniently disposed as shown in the drawings, and in such case the machine is arranged in a pit.

In use a flask 32, resting upon a pattern carrier or plate 33, is placed upon the jarring head and is filled with sand in any convenient or appropriate manner and the sand is rammed by the ordinary operation of the jarring head. The arms 9 and 10 remain at rest while the jarring head is in operation and may be supported upon the uprights 35, which underlie the brace 12. In Fig. 1, the jarring head is shown approximately in its lowest position, so that the pattern plate 33 and flask 32 rest upon it. The pattern plate, flask and bottom board 34, are secured together after the ramming is complete, for example by means of molding clamps, not shown. The pattern plate 33, may be connected with the arms 9 and 10, as by means of the wedges and keepers 36 and 37, which will be presently described, and guide pins 38 may also be provided. The piston 2, with its connected cap or hinge member 5, is then raised by the action of compressed air, as described. During the first part of this movement the couplings are extended, but thereafter the cushioning parts 18 collide with the sleeves 22, so that the length of the couplings becomes fixed. In consequence of this the arms 9 and 10, and flask roll over about the pivot 11, as a center and are deposited upon the floor or upon any suitable rest as 38, arranged for their reception, as shown by dotted lines in Fig. 1. The arms 9 and 10, remain attached to the pattern plate 33, but the flask is uncoupled and is supported on the rest 38. The stops 25, underlie and engage the parts 26 so that the arms 9 and 10, are held at right angles with the line of motion of the piston and cap or hinge member 5. The hinge member or cap 5 is then caused to lift vertically and it carries with it the arms 9 and 10 and pattern plate, which remain at right angles to it, by reason of the described lost motion in the couplings and thus the pattern is drawn straight up out of the flask. Further rising motion of the cap or hinge member 5 returns the arms to the position first described. During the descent of the cap or hinge member 5, the arms 9 and 10 and the flask carried thereby are supported upon the stops 25, and the bolt 17 and member 23 are moving down, the bolts 17 through the spring supported sleeve 22, and the member 23 is moving toward the upper end of 22. When the flask is on or near the rest 38, the member 23 abuts upon the upper end of the sleeve 22, and the spring 20 coming into compression balances the weight of the cap or hinge member and parts carried thereby so that the flask is not burdened with this weight.

The wedges 36, Fig. 4, have their shanks arranged for sliding motion in the direction of the length of the arms 9 and 10, in suitable slots formed therein. The keepers 37 are formed in the under face of the pattern carrier 33 and are thus protected from sand and the like, and the keepers have slots with inclined side-walls for the reception of the heads of the wedges and for engagement therewith. There are rods 39, slidable lengthwise in bearings carried by the arms 9 and 10, and these rods are provided with collars 40, suitably secured to them. Springs 41, interposed between the collars 40 and wedges 36 encircle the rods 39 and are disposed in sleeves projecting laterally from the shanks of the wedges, so that when the rods 39 are shifted toward the left in Fig. 4, the springs impart similar movement to the wedges and seat them in their keepers, but if any or all of the wedges are prevented, as by an accumulation of sand or the like, from entering their keepers, the spring or springs 41 of such wedge or wedges yields.

A blow valve 42, and valve casing 43 interposed in the air supply 44, may be respectively connected with the rods 39 and with one or more of the wedges 36, so that when these, i. e. wedges and rods, move together there is no relative motion of the valve parts and the valve remains closed and the machine can be operated, but if this wedge remains at rest and cannot enter its keeper 37, there is relative movement between the valve and valve casing, so that the blow valve is opened to the atmosphere and the machine cannot be operated. This arrangement is desirable because it insures attachment of the flask and arm before the machine can be operated.

There is a bell crank lever 45, carried by the arms 9 and 10. By means of its arm 46, this lever is connected with the rod 39, so that when turned in one direction or the other, the bell crank lever moves the rod 39 endwise. From the end 47, of the shaft 11, fixed to the cap 5, of the piston, projects an eccentric pin 49 having a link 50; or in other words, having pitman connection with the arm 51, on the bell crank lever 45. The link 52, pivoted at one end thereof to the base 1, or some part thereof, has slot-and-pin connection with the extension of the arm 9 and operates as a safety device. As the hinged frame rolls over, the bar 52 passes under the projecting end of the head 5, attached to the plunger 3, and if by chance the hinged frame should remain in balance while the sustaining pressure in the cylinder is exhausted, the weight of the moving parts will be caught upon the end of the link 52 and held there. Otherwise the cylinder might descend while the hinged frame remained in standing balance and if the equilibrium should then be disturbed the hinged frame would roll over without resistance and accumulate momentum so rapidly as to endanger the stops 25 and 26, when they came in contact. The link 52 therefore acts to prevent the descent of the cylinder unless the hinged frame rolls at the same time and when it rolls no lost motion can be developed to endanger the working parts of the machine.

When the parts are in the position shown in Figs. 1 and 4, the wedges 36, are clear of their keepers but as the arms 9 and 10, roll over or turn about the hinge at 11, the parts 49, 50, 51, 45 and 46, operate to draw the wedges 36 up to their keepers 37. In this way the pattern plate or carrier is locked automatically to the arms before the latter roll over. The stud 54, passing through an opening or aperture 6 is enlarged at intervals 55, corresponding to the positions where a slow movement is desired, i. e., just before making contact with stop 25 and when landing on support 38 also when engaging spring stops 18. These enlargements 55 restrict the opening 6 and thus retard the described flow of liquid at the proper times.

What we claim is:

1. A molding machine comprising a hinge member, a piston and cylinder for moving it vertically, flask carrying arms hinged to said member and provided with rearward extensions, stops for limiting the rise of the extensions to turn the arms when the hinged member rises, and a link connected to one of said extensions and brought thereby under said member when elevated to act as a support in the event of failure of the arms to rotate, substantially as described.

2. A molding machine comprising a hinge member, a piston and cylinder for moving it vertically, arms pivotally connected with the hinge member, stops for positioning the arms at right angles with the hinge member and affording them a range of turning movement, a jarring table for the reception of the arms and having means for operating it, rearward extensions from the arms, and lost motion couplings having a limited range of elongation and connected with the extensions for affording the arms a limited range of vertical motion before turning them, substantially as described.

3. In a machine of the type recited the combination with the hinge member and means for raising and lowering it, of arms pivotally connected with the hinge member and provided with rearward extensions, stops for limiting the movement of the arms, and devices connected with the extensions and adapted to afford them a limited range of vertical movement and check them to turn the arms, substantially as described.

4. The combination of flask receiving means, a jarring table and means for actuating it, a hinge member having a piston and cylinder for raising and lowering it and arranged between the jarring table and the flask receiving means, arms pivotally connected with the hinge member and having means for arresting them at right angles to the line of travel of said member, rearward extensions from the arms, and devices connected with the extensions for affording the hinge member a range of vertical motion without turning the arms and for turning the arms when the motion of the hinge member exceeds that limited range, substantially as described.

5. In a machine of the type recited the combination of a hinge member having means for raising and lowering it, flask carrying arms pivoted to said member, couplings operating to turn the arms, a pattern plate provided with keepers, rods carried by the arms, wedges having yielding connection with the rods and adapted to coöperate with the keepers, and means for shifting the rods upon the turning of the arms, substantially as described.

6. In a machine of the type recited the combination of a pivotal flask carrying arm, a rod and a fastening device carried by the arm and having yielding connection with each other, and a valve and a valve casing respectively connected with the fastening device and rod, substantially as described.

7. The combination of pivotal flask carrying arms having rearward extensions, a hinge member to which the arms are pivoted, means for raising and lowering said member, telescopic couplings attached to said extensions, and springs interposed between the members of the couplings for counter-balancing the weight of the arms, substantially as described.

8. The combination of pivotal flask carrying arms having rearward extensions, a hinge member to which said arms are pivoted, couplings attached to the extensions, a cylinder, a hollow piston having an aperture in its base, and a choke valve comprising a stud penetrating the aperture and provided with enlargements, substantially as described.

9. In a molding machine, a flask carrier, a fixed piston, a cylinder movable on the piston and operatively connected with said carrier to swing the same, and means to admit a fluid motive agent to the cylinder.

10. In a molding machine, a flask carrier mounted to swing in a vertical plane, and a single pneumatic cylinder and piston connected to the carrier, and operative to give the same a straight lift, and a subsequent rocking movement.

11. In a molding machine, a flask carrier, and pneumatic means for rocking over the same to invert the flask, and to effect a straight lift or draw of the pattern in stripping.

12. In a molding machine, a flask carrier, and a single power operated means forming a part of the machine structure, to rock over said carrier into stripping position, and to effect a straight lift of the pattern.

13. In a molding machine, a flask carrier, and a single pneumatic cylinder and piston coöperative with said carrier to swing the latter from jolting to stripping position, and to then strip the pattern from the mold.

14. In a molding machine, a flask carrier, and a single pneumatic cylinder and piston coöperative with said carrier to rock or swing the same into stripping position, and then, preparatory to a rocking movement in the reverse direction, to give the carrier a straight lift for stripping the mold.

15. In a molding machine, a flask carrier mounted to swing in a vertical plane, and power operated means forming a part of the machine structure, to give the carrier a straight lift of varying amplitude and a subsequent rocking movement.

16. In a molding machine, the combination of a base frame having a jolting support at one side and a stripping support at the opposite side, a flask carrier mounted to swing in a vertical plane between and over said supports, and means for imparting a straight lift to said carrier from either of said supports and for then rocking the same over to the other support.

17. In a molding machine, a base frame having a jolting support at one side and a stripping support at the opposite side, a pneumatic cylinder and piston intermediate said supports, a flask carrier operated by said cylinder and piston and movable thereby between said supports, and means in connection with said cylinder and piston to provide for a straight lift of the carrier from either of said supports prior to the rocking or swinging movement of the carrier.

18. In a molding machine, the combination of a base frame having supports at opposite sides, a fixed piston rising from said frame, a cylinder movable on said piston, means to admit a fluid pressure medium to said cylinder, and a flask carrier connected to said cylinder and arranged to be swung thereby from one support to the other.

19. In a rockover molding machine, the combination of a hinged mold table, an elevator device connected to the hinge of said table and provided with means for arresting said table in horizontal position, and means for causing said table to rock upon its hinge after this elevator device has raised the table a given distance.

20. In a rockover molding machine, the combination of a hinged mold table, a vertically movable plunger connected to the hinge of said table, stops on said plunger for arresting said table in horizontal position, and means coöperating with said plunger to rock said table after it has been vertically elevated a given distance.

21. A turnover and pattern drawing device for sand molding machines comprising a plate for carrying a pattern and a flask, means for engaging with said plate to raise and turn the same, and means on said first named means for automatically locking said plate and said means together during the raising and turning of said plate.

22. A turnover and pattern drawing device for sand molding machines comprising a plate for carrying a pattern and a flask, turnover arms for engaging with said plate to raise and turn the same, and means on said turnover arms for automatically locking said plate and said arms together during the raising and turning of said plate.

In testimony whereof we have hereunto signed our names.

WILFRED LEWIS.
JOHN T. RAMSDEN.

Witnesses:
CLIFFORD K. CASSEL,
FRANK E. FRENCH.